(12) United States Patent
Parack

(10) Patent No.: US 12,030,460 B2
(45) Date of Patent: Jul. 9, 2024

(54) LADDER ASSEMBLY FOR A VEHICLE

(71) Applicant: JAGUAR LAND ROVER LIMITED, Warwickshire (GB)

(72) Inventor: Mudassir Parack, Warwickshire (GB)

(73) Assignee: JAGUAR LAND ROVER LIMITED, Coventry (GB)

(*) Notice: Subject to any disclaimer, the term of this patent is extended or adjusted under 35 U.S.C. 154(b) by 0 days.

(21) Appl. No.: 17/597,432

(22) PCT Filed: Jul. 3, 2020

(86) PCT No.: PCT/EP2020/068891
§ 371 (c)(1),
(2) Date: Jan. 5, 2022

(87) PCT Pub. No.: WO2021/004967
PCT Pub. Date: Jan. 14, 2021

(65) Prior Publication Data
US 2022/0289112 A1 Sep. 15, 2022

(30) Foreign Application Priority Data
Jul. 5, 2019 (GB) .................................... 1909711

(51) Int. Cl.
*B60R 3/00* (2006.01)
*B60R 3/02* (2006.01)

(52) U.S. Cl.
CPC ............... *B60R 3/005* (2013.01); *B60R 3/02* (2013.01)

(58) Field of Classification Search
CPC .......... B60R 3/005; B60R 3/02; B60R 3/007; E06C 5/04; E06C 9/085; Y10T 403/7092; Y10T 403/7015; Y10T 403/7005
See application file for complete search history.

(56) References Cited

U.S. PATENT DOCUMENTS 3,869,022 A * 3/1975 Wallk .................... E02F 9/0833
 182/98
6,012,545 A 1/2000 Faleide
(Continued)

FOREIGN PATENT DOCUMENTS

CN 1149661 A 5/1997
CN 203347675 U 12/2013
(Continued)

OTHER PUBLICATIONS

State Intellectual Property Office of the People's Republic of China, Office Action and Search Report Issued in Application No. 202080056260.4, Apr. 7, 2023, 21 pages. (Submitted with Machine Translation).
(Continued)

*Primary Examiner* — Brian D Mattei
*Assistant Examiner* — Jacob G Sweeney
(74) *Attorney, Agent, or Firm* — McCoy Russell LLP

(57) ABSTRACT

A ladder assembly for a vehicle can include: a support frame; a ladder comprising a first portion and a second portion coupled to and retractably extendable from the first portion; a linkage means coupling the first portion to the frame; and a releasable latching means arranged to releasably latch the second portion to the first portion, wherein the ladder assembly is movable between: a stowed condition in which the ladder is stowed adjacent to the frame, the second portion is retracted and latched to the first portion by the latching means; a deployed condition where the ladder is deployed from the frame and the second portion is released from the first portion by the latching means; and an extended condition where the ladder is deployed from the frame and the second portion is extended from the first portion.

18 Claims, 10 Drawing Sheets

(56) References Cited

U.S. PATENT DOCUMENTS

| | | |
|---|---|---|
| 6,378,654 B1 | 4/2002 | Ziaylek, Jr. et al. |
| 6,942,271 B1 | 9/2005 | Jamison et al. |
| 9,914,396 B1 | 3/2018 | Scott |
| 2014/0158465 A1 | 6/2014 | Salzman |
| 2017/0144605 A1 | 5/2017 | Kelly et al. |
| 2018/0290596 A1 | 10/2018 | Fukushima et al. |

FOREIGN PATENT DOCUMENTS

| | | | |
|---|---|---|---|
| CN | 207905006 U | 9/2018 | |
| DE | 202008007972 U1 | 10/2009 | |
| EP | 2298998 A2 * | 3/2011 | ........... E01D 19/106 |
| EP | 3306030 A1 | 4/2018 | |
| GB | 2347402 A | 9/2000 | |
| JP | H0711447 U | 2/1995 | |
| JP | H0732890 A | 2/1995 | |
| JP | 108158768 A | 6/1996 | |
| JP | H08198074 A | 8/1996 | |
| JP | 2004150018 A | 5/2004 | |
| JP | 2014214579 A | 11/2014 | |

OTHER PUBLICATIONS

Great Britain Intellectual Property Office, Combined Search and Examination Report Issued in Application No. GB1909711.2, Apr. 22, 2020, 5 pages.

ISA European Patent Office, International Search Report and Written Opinion Issued in Application No. PCT/EP2020/068891, Aug. 28, 2020, WIPO, 14 pages.

Japanese Patent Office, Office Action Issued in Application No. 2022-500149, Mar. 5, 2024, 15 pages. (Submitted with Machine Translation).

European Patent Office, Office Action Issued in Application No. 20739593.0, May 6, 2024, Germany, 7 pages.

\* cited by examiner

LADDER ASSEMBLY FOR A VEHICLE

CROSS REFERENCE TO RELATED APPLICATIONS

The present application is a U.S. National Phase of International Application No. PCT/EP2020/068891 entitled "LADDER ASSEMBLY FOR A VEHICLE," and filed on Jul. 3, 2020. International Application No. PCT/EP2020/068891 claims priority to Great Britain Patent Application No. 1909711.2 filed on Jul. 5, 2019. The entire contents of each of the above-listed applications are hereby incorporated by reference for all purposes.

TECHNICAL FIELD

The present disclosure relates to a ladder assembly for a vehicle. Aspects of the disclosure relate to a ladder assembly for a vehicle and to a vehicle comprising a ladder assembly.

BACKGROUND AND SUMMARY

Ladders can be used to access aspects of a vehicle, for example a roof rack. It is known to attach a ladder to a vehicle. Collapsible ladders can be used for that purpose to permit stowage of the ladder when not in use. For example a ladder that has a first part and a second part pivotally attached to each other can be folded to stow and unfolded for use as a ladder. However, such a ladder can rely on contact between the unfolded part and the vehicle body or surface on which the vehicle is standing. It is an aim of the present disclosure to address the disadvantages of the prior art.

Aspects and embodiments of the disclosure provide a ladder assembly and a vehicle.

According to an aspect of the present disclosure there is provided a ladder assembly comprising: a support frame; a ladder comprising a first portion and a second portion coupled to and retractably extendable from the first portion; a linkage means coupling the first portion of the ladder to the frame; and a releasable latching means arranged to releasably latch the second portion of the ladder to the first portion, wherein the ladder assembly is movable between:

a stowed condition in which the ladder is stowed adjacent to the frame, the second portion of the ladder is retracted and the second portion is latched to the first portion by the releasable latching means;

a deployed condition where the ladder is deployed from the frame and the second portion is released from the first portion by the releasable latching means; and, an extended condition where the ladder is deployed from the frame and the second portion is extended from the first portion.

The disclosure provides a two stage deployment and extension in which the ladder cannot be extended while in the stowed condition. In the deployed condition, when the ladder is deployed away from the frame, the ladder is spaced apart from the frame, and thus in use spaced apart from the bodywork of the vehicle on which it is mounted. This enables the ladder to be deployed away from its mounting position when mounted on a host vehicle before being extended. This prevents contact of the ladder with vehicle bodywork and permits a user of the ladder to extend their feet between rungs of the ladder.

The ladder assembly may comprise a pivot joint coupling the first portion and the second portion of the ladder whereby the second portion is pivotable from the first portion to provide said extension of the second portion from the first portion.

The linkage means may comprise two linking arms each arranged to couple the first portion of the ladder to the frame to form a four bar linkage mechanism comprising the linkage means, the first portion and the frame.

In an embodiment the ladder assembly comprises a locking means arranged to releasably lock the second portion of the ladder to the frame when in the stowed condition, the locking means comprising a release mechanism arranged to release the locking means for movement of the assembly from the stowed condition to the deployed condition.

The ladder assembly may further comprise a housing comprising said frame and at least one shroud arranged to: cover part of the frame; provide a seal between the ladder assembly and the vehicle; and aerodynamically conceal the ladder when in the stowed condition.

By aerodynamically conceal it will be understood that the ladder sits within the shroud so that it is not in a direct path of air flowing along the side of the vehicle on which the ladder is mounted when the vehicle is moving in its normal way, for example travelling forwards or backwards.

In an embodiment the ladder assembly comprises an interlock arranged to releasably retain the ladder assembly in the extended condition, wherein the interlock comprises a biasing means configured to bias the interlock towards a locked configuration in which the extended condition is retained, and wherein a force is required to overcome the biasing means to move the interlock towards an unlocked configuration in which the ladder assembly can be moved to the deployed condition from the extended condition.

The latching means may comprise a hook and a lug, wherein the linking arms comprises the hook and the second portion of the ladder comprises the lug. In an embodiment the first portion of the ladder and the second portion of the ladder each comprise a hook aperture and the second portion comprises an inner surface arranged to provide said lug, wherein the hook is arranged to pass through the aperture to hook the inner surface of the second portion to latch the ladder assembly in the stowed condition.

The ladder assembly may comprise a fixing means suitable for fixing the ladder assembly to a vehicle, wherein at least part of the fixing means are concealed by a rung of the ladder when the ladder assembly is in the stowed condition.

The ladder assembly may comprise a deployment limiting means arranged to stop deployment of the ladder assembly at the deployed condition.

In another aspect of the disclosure there is provided a vehicle comprising a ladder assembly as hereinbefore defined.

Within the scope of this application it is expressly intended that the various aspects, embodiments, examples and alternatives set out in the preceding paragraphs, in the following description and drawings, and the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGURES

One or more embodiments of the disclosure will now be described, by way of example only, with reference to the accompanying drawings, in which.

DETAILED DESCRIPTION

Figure 1A:
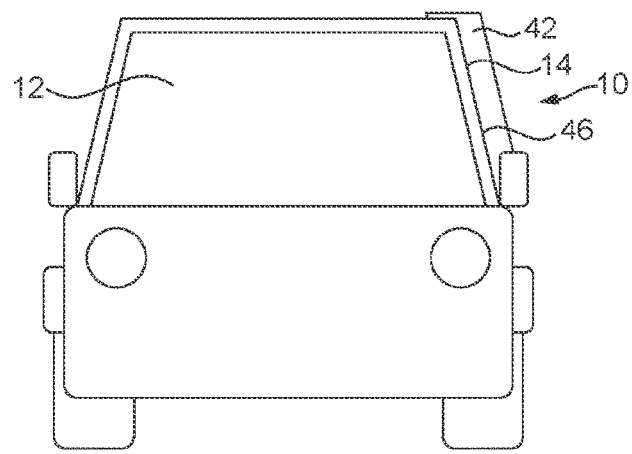
FIGS. 1A to 1C show a schematic view of a vehicle and ladder assembly according to an embodiment of the disclosure.
Figure 1B:
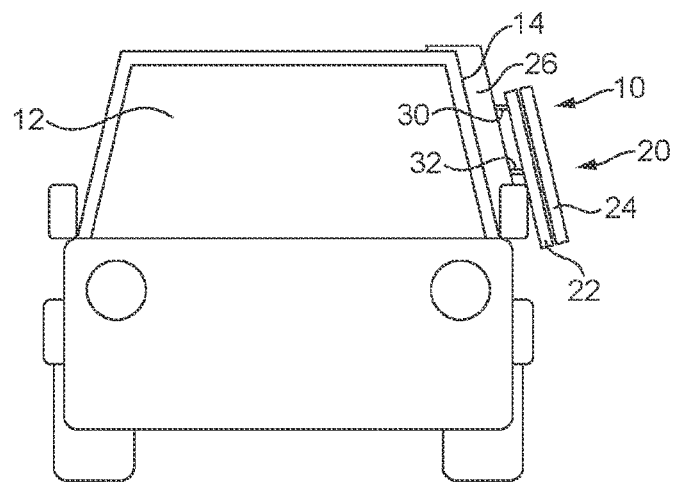
Figure 1C:
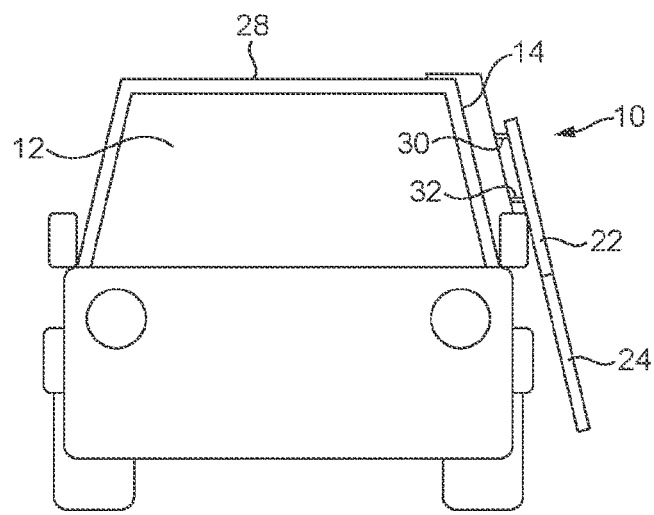

A ladder assembly 10 for a vehicle 12 in accordance with an embodiment of the present disclosure is described herein with reference to the accompanying figures. As shown in FIGS. 1A, 1B and 1C, the ladder assembly 10 is suitable for installation on a vehicle 12. In the present embodiment, the vehicle 12 is an automobile. In an embodiment, the vehicle is a sports utility vehicle (SUV). It will be understood that the ladder 10 may be installed on a vehicle 12 having other body styles, for example a station wagon, estate, shooting brake or utility. Furthermore, it will be understood that the ladder may be installed on other types of vehicle, such as a train, a boat, or on other objects, such as a building. In the example shown in FIGS. 1A and 1B the ladder assembly 10 is mounted to the side 14 of the vehicle 12. In other examples the ladder assembly 10 can be mounted to the rear, or other aspects, of the vehicle 12.

FIG. 1A shows the ladder assembly 10 in a stowed condition. FIG. 1 shows the ladder assembly in a deployed condition in which a ladder 20 comprising a first portion 22 and a second portion 24 is deployed away from a housing 26 of the ladder assembly 10. FIG. 1C shows the ladder assembly in an extended condition in which the second portion 24 is extended from the first portion 22. To reach the extended condition from the stowed condition the ladder assembly 10 transitions through the deployed condition.

In the extended condition the ladder assembly 10 provides access to aspects of the vehicle 12, for example the roof 28. The deployment away from the housing 26, provided by linking arms 30, 32, enables a user (not shown) to position their foot between and onto rungs (not visible in FIGS. 1A and 1B) of the ladder 20 without touching the side 14 of the vehicle 12. The linking arms 30, 32, may be together referred to as a linkage means.

As shown in FIGS. 1A, 1B and 1C the housing is attached to the side 14 and to the roof 28 of the vehicle using frame fixings as described below. Other attachment arrangements are within the scope of the disclosure.

Figure 2:
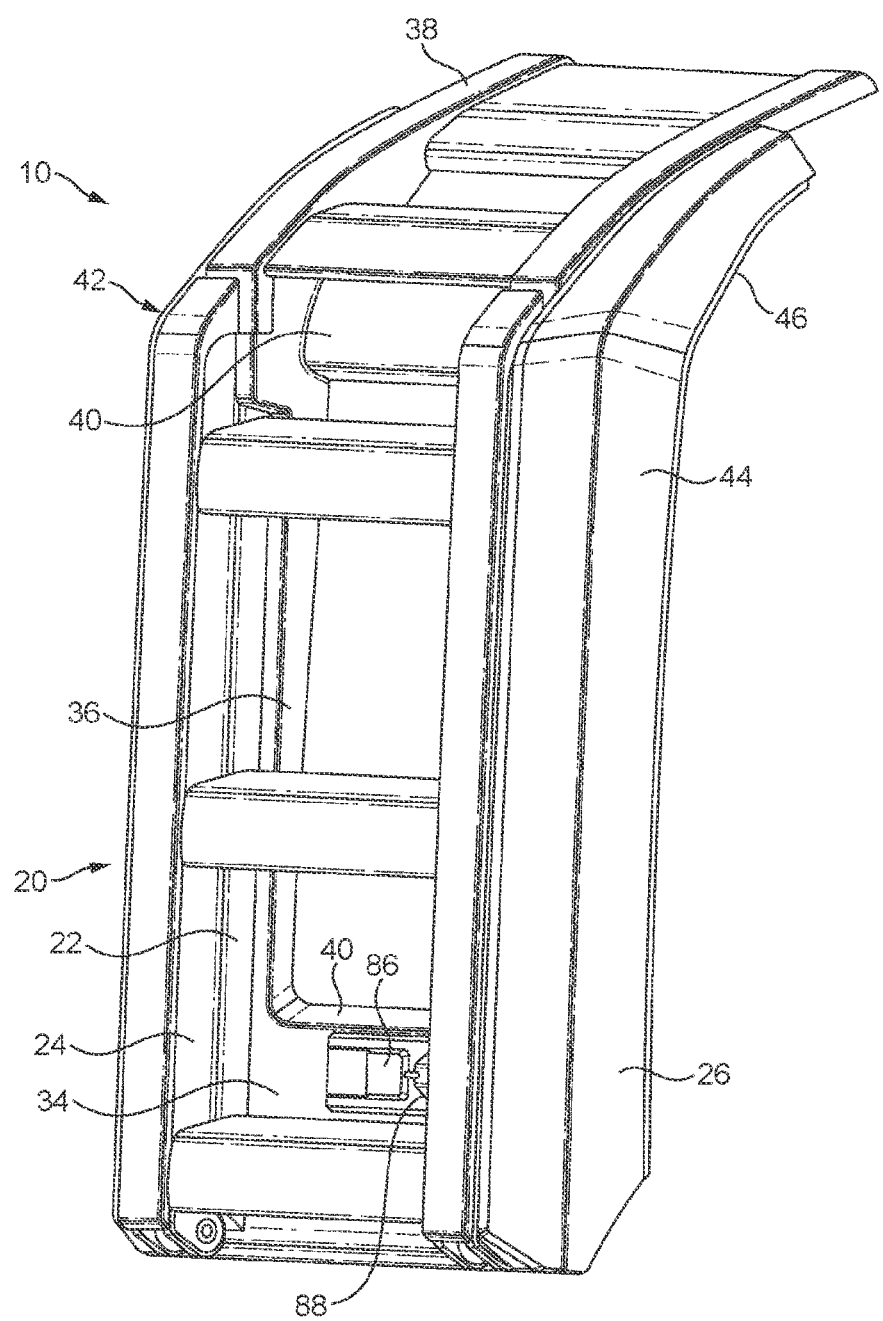
FIG. 2 shows a perspective view of a ladder assembly according to an embodiment of the disclosure in a stowed condition.

FIG. 2 shows a ladder assembly 10 according to an embodiment of the disclosure in isolation from a vehicle. The ladder assembly 10 is shown in a stowed condition. The housing 26 of the ladder assembly comprises a frame 34 which provides structural support to the ladder assembly and provides a coupling to the host vehicle when used in examples such as those shown in FIGS. 1A and 1B. An embodiment of the frame 34 is generally L shaped and inverted so that an upright portion 36 of the frame 34 couples with a first fixing point on the side of the vehicle and a lateral portion 38 of the frame 34 couples with a second fixing point on the roof of the vehicle. In embodiments of the disclosure the frame comprises two upright portions 36 and two lateral portions 38 connected by horizontal connecting members 40.

It should be understood that the terms upright, lateral and horizontal are used to define portions of the frame relative to each other and their standard in-use orientations when the ladder assembly is coupled to a vehicle. The terms are not intended to be geometrically restrictive. That is to say the term upright should be interpreted as substantially upright, the term lateral should be interpreted as substantially lateral, and the term horizontal should be interpreted as substantially horizontal.

In an embodiment of the disclosure the housing 26 of the ladder assembly 10 comprises first and second shrouds 42, 44, each comprising a profiled edge 46 shaped to mate with an A-surface of a host vehicle to which the ladder assembly can be coupled. The profile provides an aerodynamic seal of the ladder assembly 10 to the vehicle 12 so that airflow incident on the vehicle passes over the ladder assembly. This is schematically shown in FIG. 1A in which the profiled edge 46 provides a gapless seal with the vehicle 12. Additionally the shrouds 42, 44 provide an enclosure in which the ladder 20 resides when in the stowed configuration. Turning again to FIG. 1A, the shroud 42 conceals the ladder when stowed so that as the vehicle moves air passes over the shroud and thus over the concealed ladder. When the ladder 20 is deployed and extended as shown in FIGS. 1B and 1C respectively, the ladder extends beyond the shrouds.

In embodiments of the disclosure, the shrouds 42, 44 are attached to the frame 34 using releasable fixings to form the housing 26. In some embodiments the shrouds 42, 44 and the frame 34 are an integral housing component.

Figure 3:
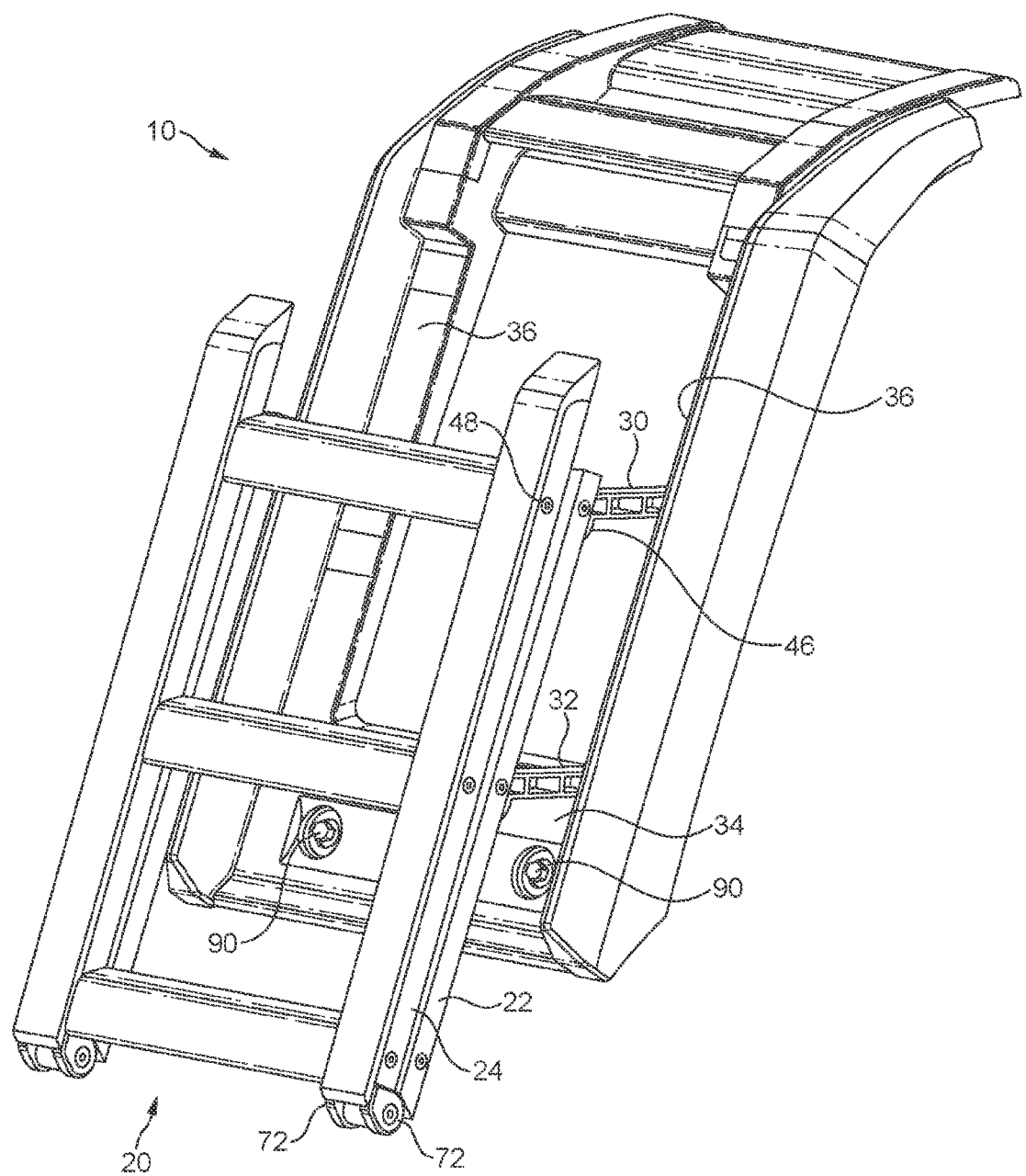
FIG. 3 shows a perspective view of a ladder assembly according to an embodiment of the disclosure in a deployed condition.

FIG. 3 shows the ladder assembly 10 of the aforementioned embodiments in the deployed configuration. As introduced in the description of FIGS. 1B and 1C, first and second linking arms 30, 32 couple the first portion 22 of the ladder 20 to the upright portion 36 of the frame 34. Each of the first and second linking arms 30, 32 are coupled to the frame and the ladder through pivot joints so that the linking arms can rotate with respect to the frame 34 and the first portion 22 of the ladder 20. It will be appreciated that the frame 34, the first portion 22 and the linking arms 30, 32 together form a four bar linkage mechanism such that rotation of the linking arms with respect to the frame and the ladder moves the ladder 20 from or toward the frame 34 while substantially retaining a parallel relationship. This permits the ladder to be stowed adjacent to the frame 34 and deployed away from the frame 34 and the vehicle to which the frame is coupled.

Although the foregoing description refers to first and second linking arms 30, 32 it will be understood that where the frame comprises two upright portions 36 or otherwise, the ladder apparatus may comprise two or more of each of the first and second linking arms 30, 32 and thus two four bar linkage mechanisms. Such an arrangement can be used for providing stability to the ladder 20 both in and in the deployed and extended positions. Where reference is made in the foregoing and following description to one first and second linking arms 30, 32 the reader should understand the description can be applied to embodiments where there are two or more first and second linking arms 30, 32.

Figure 4:
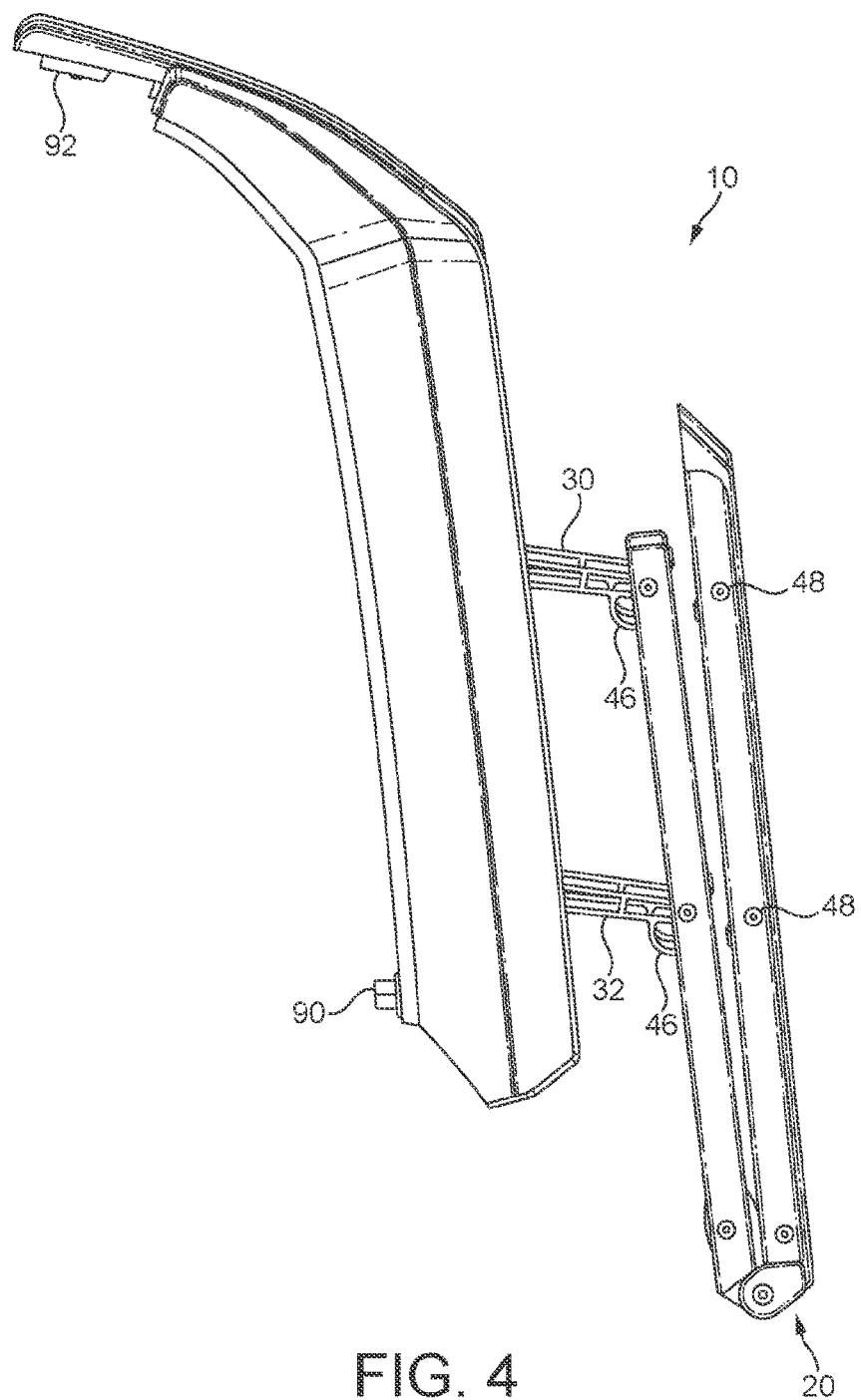
FIG. 4 shows an orthographic view of a ladder assembly according to an embodiment of the disclosure in a deployed condition.

FIG. 4 provides a side view of the ladder assembly 10 in the deployed configuration as shown in FIG. 3. In embodiments of the disclosure the first and second linking arms 30, 32 each comprise a hook 46. The hook 46 is provided at a ladder end of the linking arms and is arranged to hook a lug 48 on the second portion of the ladder when the second portion is folded against the first portion as the ladder is stowed from the deployed position through rotation of the linking arms. The hook 46 and lug 48 are collectively referred to as latching means and may retain the second portion of the ladder 20 in the folded position when the ladder is stowed.

FIG. 4 also shows the frame fixing elements 90, 92 as mentioned above. Side rail fixings 90 are provided to connect the ladder assembly via the frame 34 to the side of a vehicle. The side rail fixings may comprise bolts positioned in the body in white. Roof rail fixings 92 are used to connect the ladder assembly to a roof rail of the vehicle. The roof rail fixings may comprise an inverted T-section which engages in a channel of the roof rail. The ladder is attached to a vehicle by first locating the roof rail fixings 92 before fixing the side rail fixings 90.

Figure 5A:
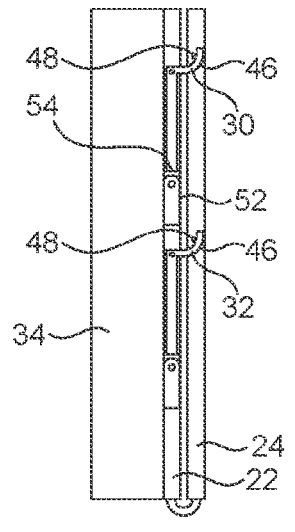
FIGS. 5A to 5C show a schematic view of a ladder assembly according to an embodiment of the disclosure in the stages between and including the stowed and deployed conditions.
Figure 5B:
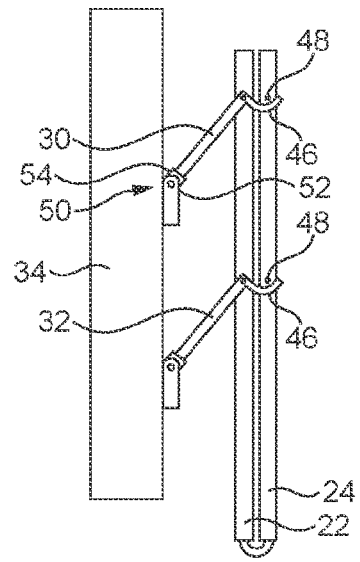
Figure 5C:
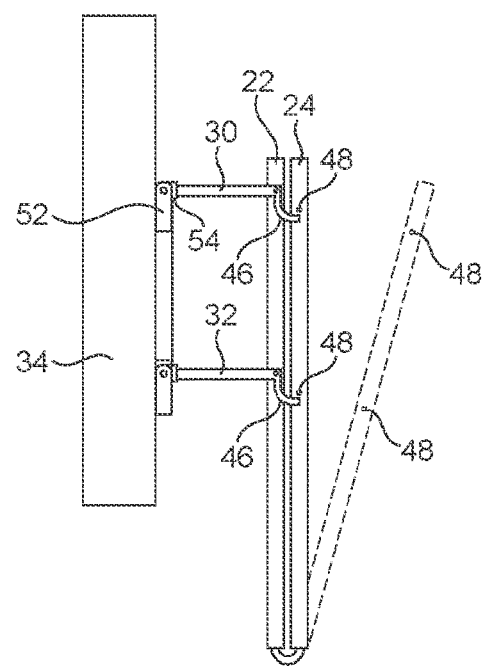

FIGS. 5A, 5B and 5C schematically show the operation of the latching means with cross sections of the frame 34, linking arms 30, 32 and the first and second portions 22, 24. FIG. 5A shows the ladder assembly in the stowed condition. As shown the hook 46 of the linking arms 30, 32 latches the lug 48 and prohibits unfolding of the second ladder portion from the first ladder portion. FIG. 5B shows the ladder assembly between the stowed and deployed conditions. As shown the hook 46 is moved away from the lug 48 by rotation of the linking arms 32, 34. FIG. 5C shows the ladder assembly in the deployed state (solid lines) and the second portion of the ladder between the deployed and a partially extended state (dashed lines). As shown the lug 48 is unlatched from the hook 46 of each linking arms 30, 32. As shown by the dashed lines this permits the second portion of the ladder to unfold from the first portion of the ladder.

FIGS. 5A to 5C further show deployment limiting means 50 provided to limit rotation of the linking arms beyond the deployed position. In an embodiment of the disclosure the deployment limiting means comprises first and second abutment surfaces 52, 54. The first abutment surface 52 is provided by a flat edge of a mounting plate 56 to which the linking arms 30, 32 is pivotably attached. The mounting plate 56 is attached to or integrally part of the frame 34. The second abutment surface 54 is provided at a frame end of the linking arms 30, 32.

As shown in FIG. 5A, in the stowed condition the first and second abutment surfaces 52, 54 are not in contact. As the linking arms 30 rotates to deploy the ladder the first and second abutment surfaces 52, 54 are brought together to prevent any further rotation as shown in FIG. 5C.

Figure 6:
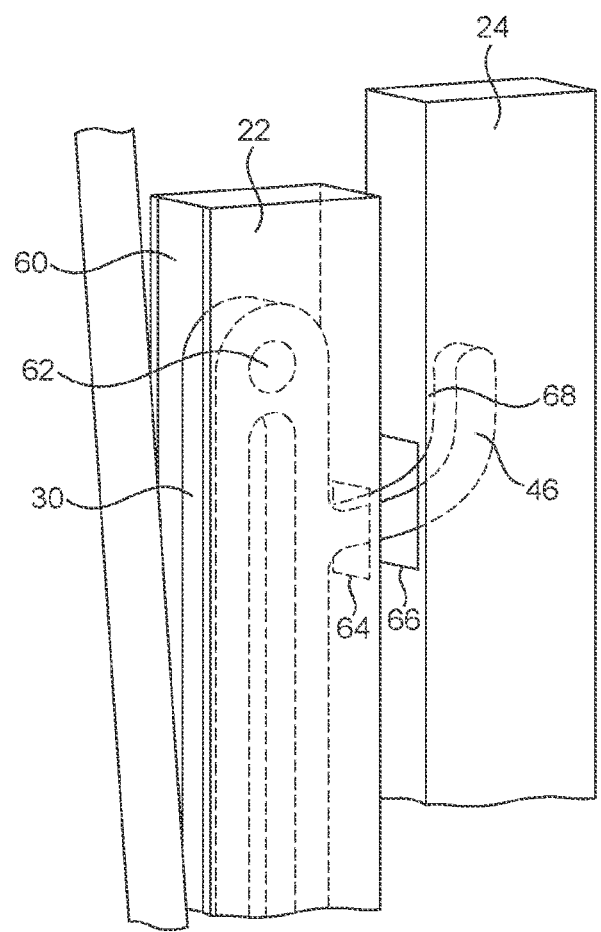
FIG. 6 shows a perspective semi-transparent view of a portion of a ladder apparatus according to an embodiment of the disclosure.

In embodiments of the disclosure the lug of the latching means is provided by an inner surface of a hollow section of the ladder. FIG. 6A shows a schematic view of the ladder assembly with components shown as transparent for ease of description. Components shown behind or inside other components are represented by dashed lines.

The first portion 22 of the ladder comprises a U shaped cross-section forming a channel 60 in which the linking arms 30 can be positioned and move. As mentioned above the linking arms is pivotably coupled at 62 to first portion 22 which further comprises a hook aperture 64 through which the hook 46 of the latching means can pass. A hook aperture 66 is also provided in the second portion 24 which comprises a hollow cross-section. In the stowed condition represented by FIG. 6 the hook 46 of the latching means passes through the hook apertures 64, 66 in the first and second ladder portions 22, 24 and contacts an inner surface 68 of the hollow section. It will be appreciated that the area contacted or hooked by the hook is termed the lug.

The U-shaped and hollow section first and second ladder portions permit the linking and latching means to operate within the dimensions of the ladder meaning that packaging space is preserved. Additionally such sectional forms, when made from aluminium, fibre glass, or the like are strong and lightweight.

Figure 7:
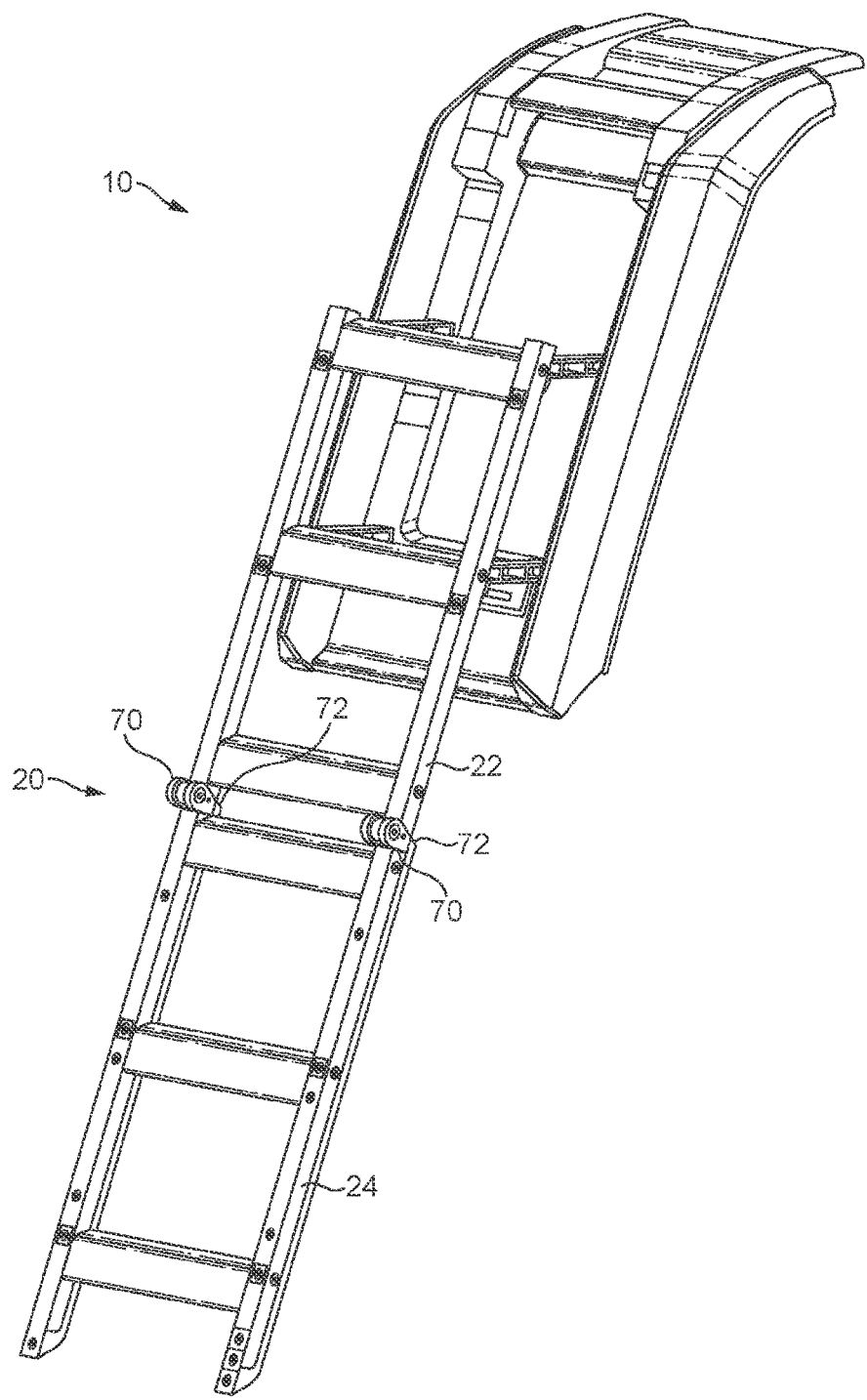
FIG. 7 shows a perspective view of a ladder assembly according to an embodiment of the disclosure in an extended condition.

FIG. 7 shows a ladder assembly 10 according to embodiments of the disclosure in the extended condition. In the extended condition the second portion 24 of the ladder 20 extends from the first portion of the ladder 22. In the embodiment shown the extension is provided by a rotation of the second portion 24 with respect to the first portion 22 about a pivot joint 70 which pivotably connects an end of each ladder portion together. The rotation and thus extension of the ladder 20 is limited by the connected ends 72 of the ladder portions coming into contact. Referring back to FIG. 3, the ends are shown to not be in contact when the ladder is retracted or not extended.

Figure 8:
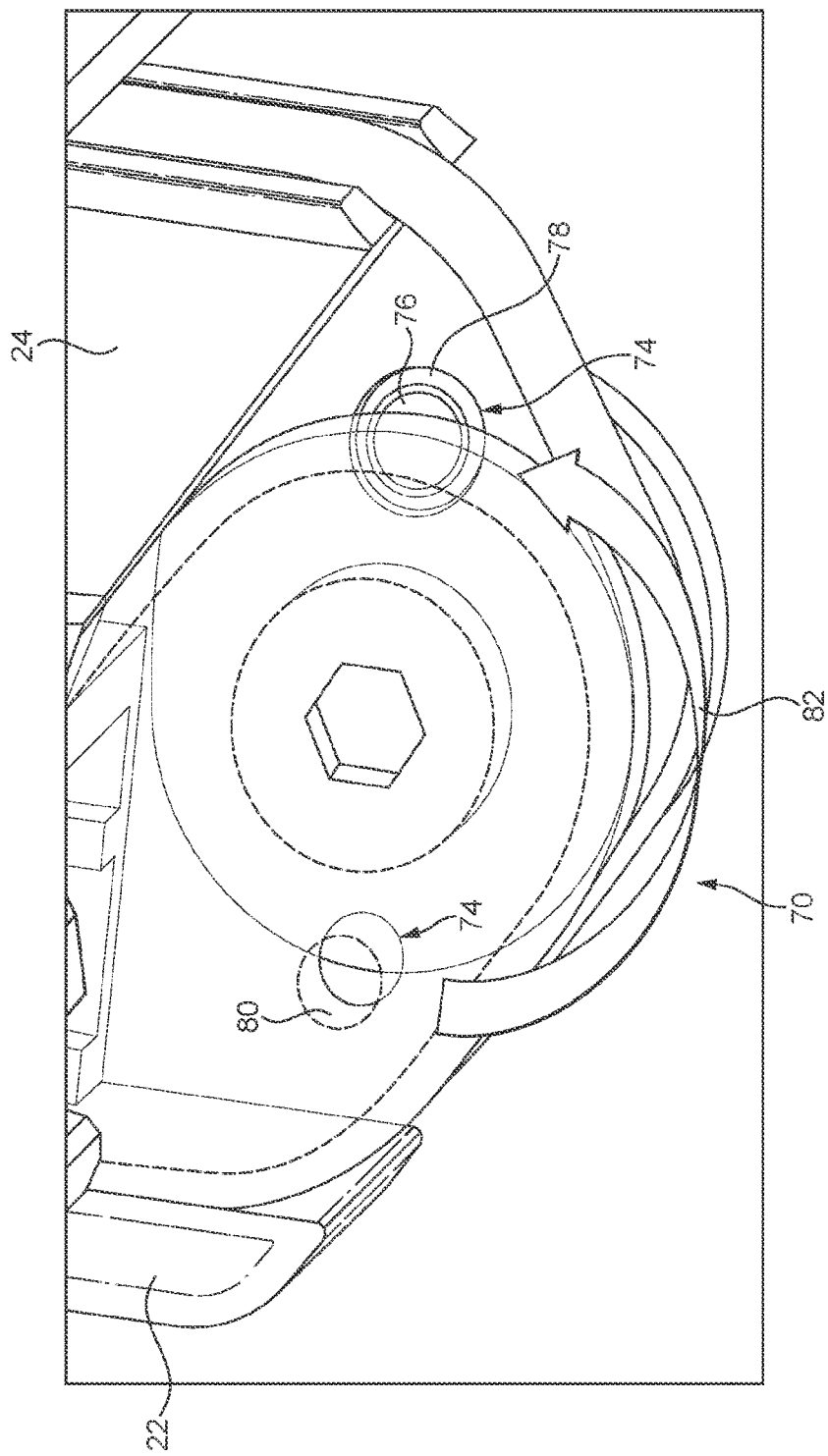
FIG. 8 shows a perspective view of a portion of a ladder apparatus according to an embodiment of the disclosure.

In embodiments of the disclosure the pivot joint comprises a spring loaded interlock 74, as shown in FIG. 8, which retains the ladder in the extended state until a force is applied to overcome the interlock. The interlock comprises a ball bearing 76 retained by and biased toward a collar 78, and a detent 80. The ball bearing 76 is positioned on the second ladder portion 74 and the detent 80 is positioned on the first ladder portion 22, each in positions such that when the ladder is extended the ball bearing engages the detent. A force applied in the direction of the arrow 82 to pivot and thus retract the second ladder portion has to overcome the bias.

Figure 9:
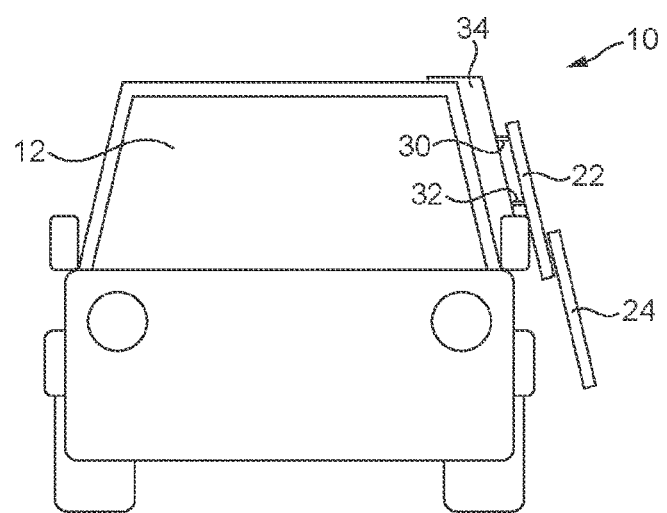
FIG. 9 shows a schematic view of a vehicle and ladder assembly according to an embodiment of the disclosure.

Other means of extension are within the scope of the disclosure. For example, in an embodiment, the second portion 24 is slidably connected to the first section 22 so that when the ladder assembly is in the deployed condition and the releasable latching means releases the second portion 24, the second portion 24 may slide to extend from the first portion 22. This is schematically shown in FIG. 9.

Figure 10:
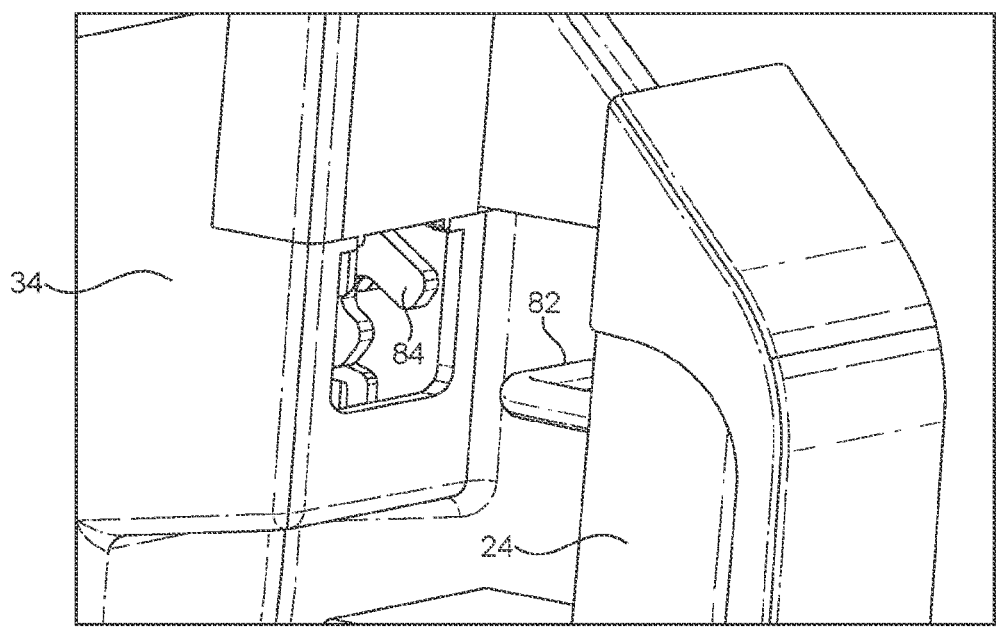
FIG. 10 shows a perspective view of a portion of a ladder apparatus according to an embodiment of the disclosure.

A locking means is provided in some embodiments of the disclosure. In an example embodiment the locking means comprises a bar 82 and a catch 84 as shown in FIG. 10. The bar is provided on or as part of the second portion 24 of the ladder while the catch is coupled to the frame 34. In the stowed condition (not shown in FIG. 10) the catch 84 engages and retains bar 82. A release mechanism comprising a lever 86 (see FIG. 2) and a Bowden cable (not shown) connecting the lever 86 to the catch 84 is arranged so that movement of the lever is transferred by the Bowden cable to move the catch. Movement of the lever 86 causing the catch 84 to move releases the bar 82 from the catch so that the ladder assembly 10 can be deployed.

The locking means further comprises a key lock 88 (see FIG. 2) arranged to releasably lock the lever 86 of the release mechanism. Through this a user can lock the ladder apparatus 10 in the stowed condition. With reference to FIGS. 3 and 4, it will be appreciated that in the stowed condition the ladder prevents access to the frame fixings 90 usable to releasably couple the ladder assembly 10 to a vehicle. The locking means therefore allows a user to lock the ladder in the stowed condition and in turn prevent access to for release of the fixings.

In the foregoing embodiments it should be understood that the ladder is a conventional style ladder in that it comprises two longitudinal sections joined together by rungs each comprising, in certain embodiments, a tread. The ladder in the foregoing embodiments comprises the first portion and the section portion, each having longitudinal sections and rungs. In the embodiment shown in FIG. 2 and discussed above, the rungs of the first and second section cover the frame fixings 90 in the stowed conditions. As shown in the figures the rungs are arranged on the first and second sections of the ladder so that in the stowed condition the rungs are adjacent to one another. This permits access to clean the space between both sets of rungs when the ladder is in the stowed condition. Other arrangements may also be useful and are within the scope of the disclosure.

It will be appreciated that various changes and modifications can be made to the present disclosure without departing from the scope of the present application.

The figures show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A ladder assembly for a vehicle, the ladder assembly comprising:
    a support frame;
    a ladder comprising a first portion and a second portion coupled to and retractably extendable from the first portion;
    a linkage means coupling the first portion of the ladder to the support frame; and
    a releasable latching means arranged to releasably latch the second portion of the ladder to the first portion,
    wherein the ladder assembly is movable between:
        a stowed condition in which the ladder is stowed adjacent to the support frame, the second portion of the ladder is retracted and the second portion is latched to the first portion by the releasable latching means;
        a deployed condition where the ladder is deployed from the support frame, such that the second portion is released from the first portion by the releasable latching means; and
        an extended condition where the ladder is deployed from the support frame and the second portion is extended from the first portion, wherein:
            the linkage means comprises two linking arms each arranged to couple the first portion of the ladder to the support frame to form a four bar linkage mechanism comprising the linkage means, the first portion and the support frame, and
            the releasable latching means comprises a hook and a lug, wherein the two linking arms comprise the hook and the second portion of the ladder comprises the lug.

2. The ladder assembly as claimed in claim 1, further comprising a pivot joint coupling the first portion and the second portion of the ladder whereby the second portion is pivotable from the first portion to provide said extension of the second portion from the first portion.

3. The ladder assembly as claimed in claim 1, wherein the second portion is slidably attached to the first portion and the second portion is slidable from the first portion to provide said extension of the second portion from the first portion.

4. The ladder assembly as claimed in claim 1, further comprising a locking means arranged to releasably lock the second portion of the ladder to the support frame when in the stowed condition, the locking means comprising a release mechanism arranged to release the locking means for movement of the ladder assembly from the stowed condition to the deployed condition.

5. The ladder assembly as claimed in claim 1, further comprising a housing comprising said frame and at least one shroud arranged to:
    cover part of the frame;
    provide a seal between the ladder assembly and the vehicle; and
    aerodynamically conceal the ladder when in the stowed condition.

6. The ladder assembly as claimed in claim 1, further comprising an interlock arranged to releasably retain the ladder assembly in the extended condition, wherein the interlock comprises a biasing means configured to bias the interlock towards a locked configuration in which the extended condition is retained, and wherein a force is required to overcome the biasing means to move the interlock towards an unlocked configuration in which the ladder assembly can be moved to the deployed condition from the extended condition.

7. The ladder assembly as claimed in claim 1, wherein the first portion and the second portion each comprise a hook aperture and the second portion comprises an inner surface arranged to provide said lug, wherein the hook is arranged to pass through the hook aperture to hook the inner surface of the second portion to latch the ladder assembly in the stowed condition.

8. The ladder assembly as claimed in claim 1, further comprising a fixing means suitable for fixing the ladder assembly to the vehicle, wherein at least part of the fixing means are concealed by a rung of the ladder when the ladder assembly is in the stowed condition.

9. The ladder assembly as claimed in claim 1, further comprising a deployment limiting means arranged to stop deployment of the ladder assembly at the deployed condition.

10. A vehicle comprising the ladder assembly as claimed in claim 1.

11. The ladder assembly as claimed in claim 1, wherein the hooks are provided at ladder ends of their respective linking arms, and are arranged to hook their respective lugs when the second portion is folded against the first portion as the ladder is stowed from the deployed condition through rotation of the linking arms.

12. A ladder assembly for a vehicle, the ladder assembly comprising:
a support frame;
a ladder comprising:
a first portion; and
a second portion coupled to and retractably extendable from the first portion, the second portion comprising a lug; and
linking arms arranged to couple the first portion of the ladder to the support frame, wherein the linking arms, the first portion and the support frame together comprise a four bar linkage mechanism, at least one of the linking arms comprising a hook;
wherein the ladder assembly is movable between:
a stowed condition, in which the ladder is stowed adjacent to the support frame, the second portion of the ladder is retracted, and the linking arms are positioned such that the hook interacts with the lug so as to prevent deployment of the second portion from the first portion;
a deployed condition, in which the ladder is deployed from the support frame, the second portion of the ladder is retracted, and the linking arms are positioned such that the hook is disengaged from the lug so as to unlatch the second portion from the first portion; and
an extended condition, in which the ladder is deployed from the support frame and the second portion is extended from the first portion.

13. The ladder assembly of claim 12, wherein movement of the ladder assembly between the stowed condition and the deployed condition rotates the linking arms such that the hook rotates relative to the lug, thereby to unlatch the second portion from the first portion.

14. The ladder assembly of claim 13, wherein the second portion comprises a hollow section defining a hook aperture through which the hook extends when the ladder assembly is in the stowed condition.

15. The ladder assembly of claim 14, wherein the hook is entirely withdrawn from the hook aperture when the ladder assembly is in the deployed condition.

16. The ladder assembly of claim 14, wherein the lug is at least partly defined by an inner surface of the hollow section adjacent to the hook aperture.

17. The ladder assembly of claim 12, wherein the first portion comprises a channel within which at least a portion of the linking arms are disposed when the ladder assembly is in the stowed condition.

18. The ladder assembly of claim 17, wherein the channel comprises a further hook aperture, through which the hook extends when the ladder assembly is in the stowed condition.

* * * * *